No. 811,558. PATENTED FEB. 6, 1906.
E. E. HANKEN.
GATE.
APPLICATION FILED APR. 7, 1905.
2 SHEETS—SHEET 1.
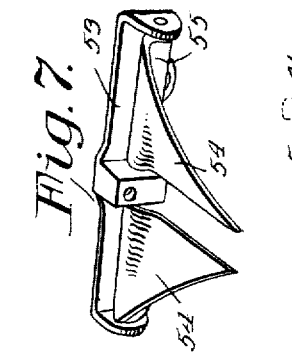
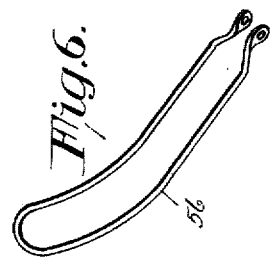
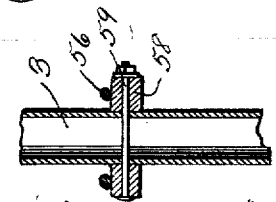
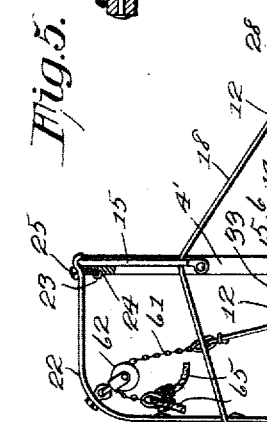
Edward E. Hanken,
Inventor
by C. A. Snow & Co.
Attorneys
Witnesses

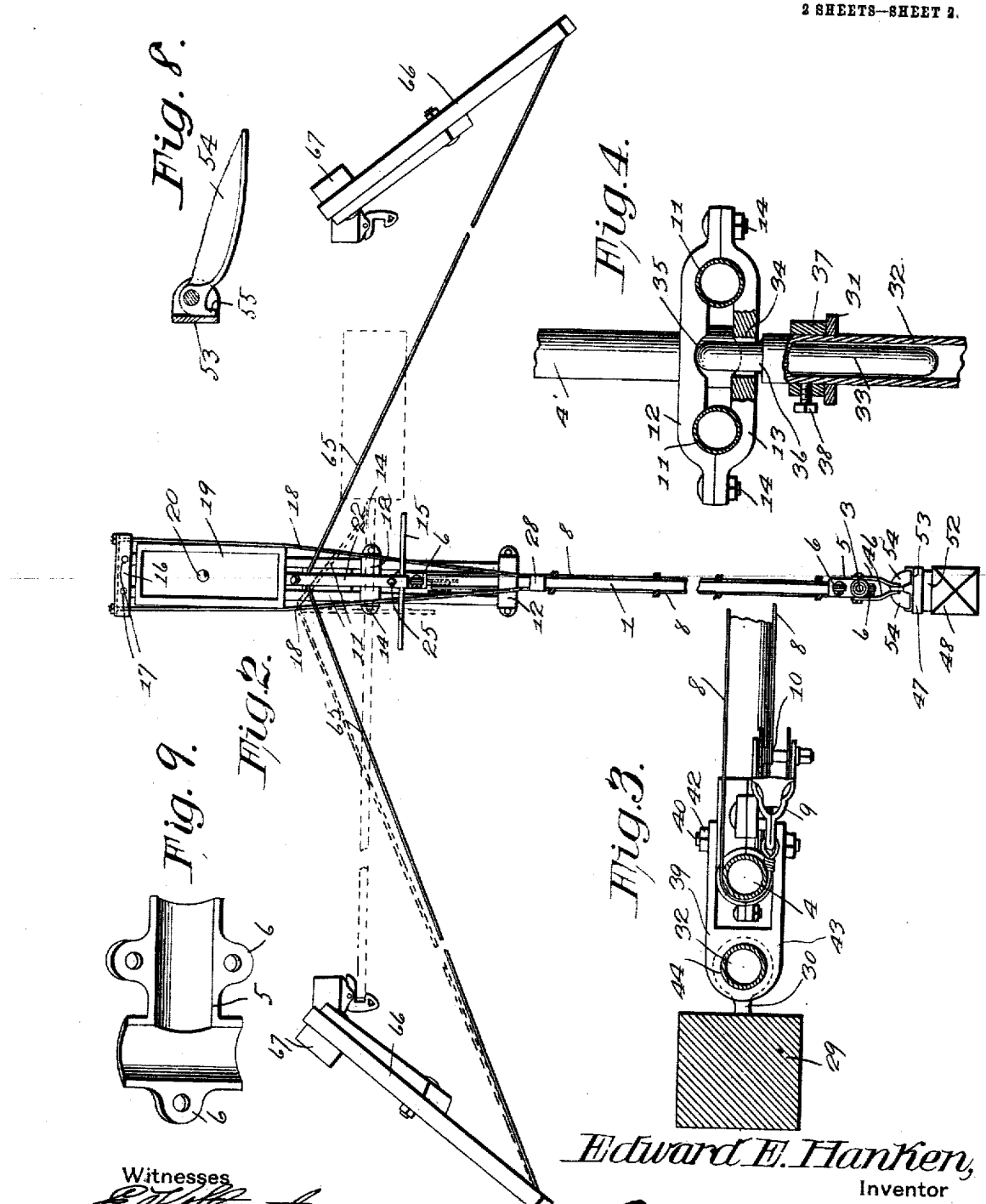

UNITED STATES PATENT OFFICE.

EDWARD E. HANKEN, OF NEW DOUGLAS, ILLINOIS.

GATE.

No. 811,558.              Specification of Letters Patent.              Patented Feb. 6, 1906.

Application filed April 7, 1905. Serial No. 254,376.

*To all whom it may concern:*

Be it known that I, EDWARD E. HANKEN, a citizen of the United States, residing at New Douglas, in the county of Madison and State of Illinois, have invented a new and useful Gate, of which the following is a specification.

This invention relates to swinging gates, and has for its object to provide certain new and useful improvements whereby the gate is particularly adapted for use on farms, public highways, and the like and to provide for opening the gate from a distance, so as to swing the gate away from the party approaching the same.
It is also proposed to balance the gate in a simple and improved manner, so as to remove the strain of the weight of the gate on the hinges thereof.

Another object of the invention is to produce improvements in the manner of latching and releasing the gate and to prevent accidental unlatching of the gate by reason of small stock attempting to pass beneath the gate.
With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of the gate embodying the features of the present invention, parts being broken away to show the pivotal support at the top of the hinged end of the gate. Fig. 2 is a top plan view of the gate. Fig. 3 is an enlarged section on the line 3 3 of Fig. 1. Fig. 4 is a fragmentary detail view of the pivotal support at the upper rear end of the gate, portions being broken away to show the assemblage of the parts. Fig. 5 is an enlarged detail sectional view taken on the line 5 5 of Fig. 1. Fig. 6 is a detail perspective view of the latch-controlling lever. Fig. 7 is a detail perspective view of one of the keepers. Fig. 8 is a detail sectional view of Fig. 7. Fig. 9 is a detail perspective view of the members of one of the T-shaped couplings of the gate-frame.
Like characters of reference designate corresponding parts in each and every figure of the drawings.

The frame of the present gate is made up of tubular bars or pipes and consists of upper and lower longitudinal bars 1 and 2, which are connected by the front and rear end bars 3 and 4, the bar 4 having its upper portion 4' rising a suitable distance above the top of the gate. The meeting ends of the longitudinal and end bars are connected by duplicate couplings 5, each coupling consisting of a pair of complementary substantially T-shaped members, which have their branches semitubular in section, so as to embrace the respective bars, and provided with registering perforate ears 6, through which bolts, rivets, or other suitable fastenings are passed to clamp the couplings upon the bars. In addition to the external frame portion there is an intermediate longitudinal brace-bar 7, which is connected at each end to the respective bars 3 and 4 by means of couplings 5, as hereinbefore described. The frame of the gate is filled in or covered by a suitable wire fabric 8, which embraces the front end bar 3 and extends rearwardly therefrom at opposite sides of the gate, with corresponding ends of the line or runner wires connected to the frames of a vertical series of ratchet-wire stretchers 9 of the windlass type, the other ends of the wires being wrapped around the drums of the respective stretchers, as indicated at 10 in Fig. 3.

At the top of the gate there is a rear extension consisting of a pair of substantially parallel tubular bars 11, which lie at opposite sides of the bar 4 in the same plane with the upper longitudinal bar 1 and extend at the front and back of the end bar 4. The front ends of the bars 11 are held in a clamp consisting of upper and lower members 12 and 13, having their inner faces provided with corresponding seats or recesses to receive the bars and their ends pierced by suitable fastenings 14 to draw the clamp members into snug engagement with the bars. The middles of the clamp members of course snugly embrace the upper frame-bar 1 of the gate. A similar clamp embraces the bars 11 adjacent the rear side of the end bar 4. A yoke 15 embraces the top of the bar 4 in a direction at right angles to the frame of the gate and has its lower ends suitably connected to the bar above the top of the gate. The rear ends of the bars 11 are connected by a transverse angle-bar 16, with fastenings 17 piercing the cross-bar and the bars 11. Truss-braces 18 pass through the yoke 15 at opposite sides of the post 4 and have their rear ends suitably connected to the downturned flange of the bar 16 and their forward ends connected to the upper frame-bar 1 at or in front of the clamp 12. A weight-box 19 is supported upon the tops of the bars 11 adjacent their inner ends and connected thereto by means of a fastening 20, piercing the bottom of the box, and an intermediate cross-bar 21, carried by the bars 11. A brace member 22 is secured to the front of the box and extends upwardly and forwardly therefrom, so as to lie against the top of the yoke 15, and is secured to the open top of the end bar 4 by means of a fastening 23, preferably in the nature of a hooked bolt, which has its lower end hooked through an opening 24, formed in the back of the bar 4', with its upper end piercing the brace 22 and provided with a nut 25, set tightly down upon the brace, whereby a single fastening serves to connect the brace 22 and the yoke 15 to the top of the bar 4.

A diagonal brace 26 has its lower end connected to a clamp or collar 27, secured upon the forward portion of the lower bar 2 of the gate, and its upper end connected to a similar clamp or collar 28, carried by the rear portion of the upper bar 1.

For the support of the gate there is a hinge-post 29 set in the ground and provided near its lower end with an eye 30, secured to the front side of the post, there being a plate 31 secured to the top of the post and projected in front thereof. An upright tubular bar 32 has its lower end loosely received within the eye 30 and its upper end loosely projected through an opening in the front part of the plate 31. An upright pintle-pin 33 is loosely received in the open top of the bar 32 with its upper portion extending through an opening 34 in the adjacent lower clamp member 13, the upper extremity of the pin being received within a seat 35 in the under side of the upper clamp member 12. An annular shoulder 36 is provided upon the upper projected portion of the pin 33 and bears upon the top of the tubular bar 32. A collar 37 adjustably embraces the upper portion of the bar 32 and rests upon the plate 31, so as to support said bar, there being a set-screw 38 piercing the collar and engaging the bar to hold the former at any elevation upon the bar. By this construction and arrangement of parts it will be understood that the frame of the gate is supported upon the top of the pintle 33 and is balanced thereon by means of the weight-box 19, which is designed to contain stones, scrap-iron, gravel, or any available material to counterbalance the weight of the frame of the gate at the other side of the upright bar 32.

To maintain the gate in its upright position, it is connected at its lower portion to the bar 32 by means of a substantially U-shaped clip 39, which embraces the adjacent coupling 5 and is adjustably connected thereto by means of a fastening 40, carried by each side of the coupling and projecting through a slot 41 in the adjacent side of the clip, there being a nut 42 provided upon the fastening, whereby the clip is adjustably secured to the frame of the gate. The cross-head portion 43 of this clip is pierced by an opening 44, loosely receiving the bar 32, whereby the clip 39 may swing easily around the bar, thereby to maintain the lower portion of the gate in vertical alinement with the upper portion thereof.

For locking the gate an upright latch-bar 45 is provided in front of the front end bar 3 and loosely connected thereto by upper and lower links 46 to permit endwise movement of the bar. A keeper-bar 47 is secured to the latch-post 48 by means of upper and lower fastenings 49, projected forwardly from the post and extending through longitudinal slots 50 in the bar, there being heads 51 formed by nuts and washers upon the outer ends of the fastenings and wedges or chock-blocks 52 driven in between the bar 47 and the post 48 to rigidly hold the bar at any elevation. Upon the front face of this bar there are two or more keepers for engagement by the latch-bar 45, one of such keepers being shown in detail in Fig. 7 of the drawings. This keeper comprises a bracket 53, connected to the bar 47 and provided with a pair of spaced substantially horizontal wings 54, each of which is pivoted to the bracket, so as to swing vertically and normally gravitate into a horizontal position with its rear end portion 55 depending below the pivot of the wing and engaging the front side of the bracket to support the wing in a substantially horizontal position. The wings are flared upwardly and outwardly from their inner edges, and when the latch-bar 45 engages the outer edge of either wing 54 it wipes past the latter, which swings upwardly, so as to permit of the passage of the bar until the latter is arrested by contact with the inner straight edge of the other wing, whereupon the upwardly-displaced wing automatically gravitates into its normal horizontal position with the latch-bar held between the two keeper-wings. The latch-bar may be released from the keepers by swinging the same upwardly and rearwardly to the dotted-line position, so as to clear the free tips of the wings. For convenience in controlling the latch-bar there is a lever 56, consisting of a bar bent into substantially U shape, so as to straddle the bar 3, and connected to the latch-bar, as at 57. At the point where the lever straddles the gate-bar 3 there is a fulcrum-support for the lever, consisting of antifriction sleeves or rollers 58, carried by a rod or bolt 59, piercing the bar 3.

A rope or wire 60 is connected to the lever 56 and extends rearwardly beneath the crosshead formed by the clamp 12 in rear of the bar 4 and thence upwardly to a chain 61, which passes through a guide or pulley 62, having a swivel connection with the brace 22.

To prevent upward tilting of the gate by the action of small stock attempting to pass beneath the gate, the lower longitudinal bar of the gate-frame is projected in front of the front end bar 3 and provided with an antifriction-roller 63, mounted upon a horizontal axis and designed to enter a fixed keeper 64, carried by the lower portion of the front face of the bar 47, said keeper overhanging and also extending below the periphery of the roller, so as to prevent elevation and depression of the free end of the gate.

As hereinbefore indicated, it is proposed to effect opening of the gate from either side thereof and at a distance therefrom, wherefore cables 65 are connected to the free end of the chain 61 and extended for suitable distances at opposite sides of the gate to elevated arms 66, carried by posts 67, the free ends of the cables of course depending from the arms, so as to be accessible from a vehicle. Upon pulling down upon the free end of either cable 65 the chain 61 and the element 60 will pull upon the lever 56, so as to rock the same, and thereby swing the latch-bar 45 upwardly and rearwardly into the dotted-line position out of engagement with the keepers, after which the pull comes upon the rear extension of the gate in rear of its pivotal support, which tends to swing the gate open away from the traveler. After passing through the gateway the other cable 65 is pulled to close the gate, the latch-bar 45 of course engaging with the keepers in the manner hereinbefore described. When the gate is open at either side of its closed position, one end of the cross head or yoke 15 is in engagement with one of the cables 65, as indicated by dotted lines in Fig. 2 of the drawings, so that when the cable 65 is pulled to close the gate the pull of the cable will be applied directly to the yoke or cross-head 15, which is in front of the pivotal axis of the gate, and thereby tends to impart an initial closing movement to the gate, so as to insure a prompt swinging of the gate from its open to its closed positions.

The gate can of course be opened without manipulating either of the controlling-cables 25 merely by manipulating the latch-lever 56 directly by the hand to release the latch-bar 45 from the keepers.

After the gate has been set up if the rod 1 sags and it becomes necessary to raise the free end of the gate this adjustment may be accomplished in a very simple and convenient manner by loosening the fastenings 14, which connect the clamp members 12 and 13, and then sliding the latter forward, together with the loop of brace 18, which embraces the top bar 1, the fastenings 14 of course being afterward tightened, so as to support the gate in its elevated position.

As best shown in Fig. 8 of the drawings, it will be noted that the inner edge of each latch member or wing 54 lies below the pivotal support of the wing, and therefore lateral pressure of the latch-bar 45 against either wing tends to hold the latter down rather than to force the same upwardly, and thereby release the latch-bar. As said inner edge of the wing is normally below the pivotal support of the wing, it is in position when elevated to cause the wing to gravitate to its normal position.

Having thus described the invention, what is claimed is—

1. The combination with a support, of an upright pintle-bar carried thereby, a swinging gate counterbalanced upon the top of the pintle-bar, and a substantially U-shaped clip loosely embracing the pintle-bar and straddling the lower portion of the gate, the sides of the clip being longitudinally slotted, and fastening means carried by the gate and adjustably engaging the slots.

2. The combination with a support, of a swinging gate having a rear extension pivotally sustained upon the top of the support, an upright rising from the gate in front of the pivotal support of the gate, a cross-bar carried by the upright, truss-bars extending from the top longitudinal bar of the gate rearwardly across the cross-bar and connected to the rear end of the extension, and a counterweight supported upon the extension in rear of the pivotal support.

3. The combination with a support, of a swinging gate having a rear extension pivotally sustained upon the top of the support, a counterbalance carried by the rear extension, an upright rising from the top of the gate, a brace extending between the counterweight and the upright, a latch carried by the free end of the gate, a guide carried by the brace in rear of the pivotal support of the gate, and a flexible latch-controlling element extending rearwardly from the latch and through the guide with portions extending at opposite sides of the gate.

4. The combination with a vertically-adjustable swinging gate, a latch-post having a vertically-adjustable keeper, a front extension at the lower edge of the gate for engagement with the keeper in the closed condition of the gate to support the gate against sagging.

5. The combination with a vertically-adjustable swinging gate, a latch-post having a vertically-adjustable keeper adjacent the lower end thereof, a longitudinal projection of the lower bar in front of the gate and disposed for engagement with the keeper in the closed condition of the gate and to support the gate against sagging.

6. The combination with a vertically-adjustable swinging gate, a latch-post having a vertically-adjustable keeper adjacent its lower end and open at opposite sides, a front extension of the lower bar of the gate disposed to enter the keeper through either side thereof and to support the gate against sagging when closed.

7. The combination with a vertically-adjustable swinging gate, a latch-post having a vertically-adjustable keeper upon the lower portion thereof, of a longitudinal bar extended in front of the gate and provided with an antifriction-roller to enter the keeper and support the gate against sagging when closed.

8. The combination with a vertically-adjustable swinging gate, a latch-post, a vertically-adjustable latch-bar carried by the post, upper and lower keepers carried by the bar, a projection extending in front of the gate and disposed to engage the lower keeper in the closed condition of the gate and to support the gate against sagging, and a latch carried by the gate for engagement with the upper keeper when the gate is closed.

9. The combination of a latch-post having upper and lower substantially horizontal projections, a latch-bar having longitudinal slots receiving the projections, adjustable heads carried by the outer ends of the fastenings and arranged to engage the latch-bar, a washer fitted between the bar and the post to adjust the former with respect to the latter, a keeper carried by the bar, and a vertically-adjustable swinging gate having a latch for engagement with the keeper.

In testimony that I claim the foregoing as my own I have hereto affixed my signature in the presence of two witnesses.

EDWARD E. HANKEN.

Witnesses:
H. H. COBURN,
P. H. FINLEY.